(12) United States Patent
Ahmed et al.

(10) Patent No.: US 12,338,176 B2
(45) Date of Patent: *Jun. 24, 2025

(54) HYBRID AND SUSTAINABLE BIO-COMPOSITE CONSTRUCTION REPAIR MATERIAL FOR CONSTRUCTION ENRICHED WITH MWCNT

(71) Applicant: UNITED ARAB EMIRATES UNIVERSITY, Al Ain (AE)

(72) Inventors: Waleed Khalil Ahmed, Al Ain (AE); Ali H. Al-Marzouqi, Al Ain (AE); Noura Juaan Mubarak Al Mazrouei, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,717

(22) Filed: May 2, 2024

(65) Prior Publication Data

US 2024/0279119 A1 Aug. 22, 2024

Related U.S. Application Data

(63) Continuation-in-part of application No. 17/940,832, filed on Sep. 8, 2022.

(51) Int. Cl.
*C04B 14/02* (2006.01)
*C04B 14/06* (2006.01)
(Continued)

(52) U.S. Cl.
CPC .......... *C04B 26/006* (2013.01); *C04B 14/026* (2013.01); *C04B 14/06* (2013.01);
(Continued)

(58) Field of Classification Search
CPC ....... C04B 14/026; C04B 14/06; C04B 26/28; C04B 40/0046; C04B 40/0259; C04B 40/0263; C08K 3/34
See application file for complete search history.

(56) References Cited

U.S. PATENT DOCUMENTS

| 6,110,271 A * | 8/2000 | Skaggs .................. C04B 24/38 |
| | | 106/729 |
| 2008/0050176 A1* | 2/2008 | Amarena ................ C04B 26/04 |
| | | 404/32 |

(Continued)

FOREIGN PATENT DOCUMENTS

| CN | 1209812 A * | 3/1999 | ........... C04B 24/166 |
| CN | 106495658 A * | 3/2017 | |

(Continued)

OTHER PUBLICATIONS

Xu et al., Molecular characteristics and rheological properties of water-extractable polysaccharides derived from okra (*Abelmoschus esculentus* L.), International Journal of Food Properties 2017, vol. 20, No. S1, S899-S909.*

(Continued)

*Primary Examiner* — Jun Li
(74) *Attorney, Agent, or Firm* — Nath, Goldberg & Meyer; Joshua B. Goldberg (57) ABSTRACT

A bio-composite plastering material and a method of making the same are provided. The bio-composite plastering material includes a mixture of sand-silica, *Abelmoschus esculentus* powder, and multi-walled carbon nanotubes. The bio-composite plastering material has increased compressive strength depending upon the concentration of *Abelmoschus esculentus* powder and multi-walled carbon nanotubes used. The method of making the bio-composite plastering material includes sieving the sand-silica to produce sand-silica of a uniform particle size, mixing powdered *Abelmoschus escu-*

(Continued)

*lentus* powder with the sand-silica to produce a first mixture, mixing water with the first mixture to produce the bio-composite plastering material, and enhancing the bio-composite material by adding multi-walled carbon nanotubes. The bio-composite plastering material may then be plaster cast, such as by pressing the bio-composite plastering material in a hot press and drying the resulting bio-composite material in an oven.

20 Claims, 9 Drawing Sheets (51) Int. Cl.
*C04B 26/00* (2006.01)
*C04B 40/00* (2006.01)
*C04B 40/02* (2006.01)
C04B 111/72 (2006.01)

(52) U.S. Cl.
CPC ...... *C04B 40/0046* (2013.01); *C04B 40/0259* (2013.01); *C04B 40/0263* (2013.01); *C04B 2111/72* (2013.01)

(56) References Cited

U.S. PATENT DOCUMENTS

| | | | | |
|---|---|---|---|---|
| 2012/0328788 | A1* | 12/2012 | Willimann | C04B 40/0039 524/297 |
| 2014/0171553 | A1 | 6/2014 | Wunderlich et al. | |
| 2022/0017418 | A1* | 1/2022 | Akono | C04B 14/386 |

FOREIGN PATENT DOCUMENTS

| | | | | |
|---|---|---|---|---|
| CN | 107501979 | A | | 12/2017 |
| CN | 107602042 | A * | 1/2018 | |
| CN | 108148341 | A | | 6/2018 |
| CN | 109021646 | A | | 12/2018 |
| CN | 115231874 | A * | 10/2022 | |
| GB | 2471096 | A | | 12/2010 |
| TW | 200938515 | A * | 9/2009 | ............. C04B 14/04 |
| WO | WO-2010112197 | A1 * | 10/2010 | ............. C04B 18/24 |

OTHER PUBLICATIONS

Srinivasababu, N., "An Overview of Okra Fibre Reinforced Polymer Composites," IOP Conference Series: Materials Science and Engineering, 83, 2015.
Reddy, S. P., et al., "Tensile and Flexural Strength of Okra Fiber Reinforced Polymer Composites," International Journal of Engineering and Management Research, vol. 6, Issue-1, Jan.-Feb. 2016, p. No. 491-495.
Gironi, F., et al., "Bioplastics and Petroleum-based Plastics: Strengths and Weaknesses," Energy Sources, Part A: Recovery, Utilization, and Environmental Effects, 33: pp. 1949-1959, Aug. 2011.
Balart, R., et al., "Biopolymers from Natural Resources," polymers 13: 2532 Jul. 2021.
Chatterjee, S., et al., "Novel Approach of Extraction and Characterization of Okra Gum as a Binder for Tablet Formulation," Asian Journal of Pharmaceutical and clinical Research 12(1): pp. 189-192 (2019).
Hussain, A., et al., "An Evaluation of the Binding Stength of Okra Gum and the Drug Release Characteristics of Tablets Prepared from it," Pharmaceutics 9(2): 20 (2017).
Hazarika, et al. (Use of a plant based polymeric material as low cost chemical admixture in cement mortar and concrete preparations, Journal of Building Engineering 15, 2018, 194-202).

* cited by examiner

HYBRID AND SUSTAINABLE BIO-COMPOSITE CONSTRUCTION REPAIR MATERIAL FOR CONSTRUCTION ENRICHED WITH MWCNT

CROSS-REFERENCE TO RELATED APPLICATION

This application is a continuation-in-part of U.S. patent application Ser. No. 17/940,832, filed on Sep. 8, 2022, the entire contents of which are incorporated herein by reference.

BACKGROUND

1. Field

The disclosure of the present patent application relates to plastering materials, and particularly to a bio-composite plastering material and method of making the bio-composite plastering material.

2. Description of the Related Art

Commonly used polymeric materials and additives include petroleum-derived chemically synthesized polymers that are largely used for construction applications. Recently, polymers have become one of the most widespread hazards in the aquatic environment throughout the world. Plastic waste in the form of synthetic polymers has been detected throughout the world's ecosystem. Some of these toxic materials can be very hazardous, nondegradable, and hydrophobic. Also, there are a significant amount of polymers in the atmosphere that might be discharged through spillage or overflow from converters and other systems. These materials can be found in packing materials, electronic equipment, insecticidal chemicals, fabric, and manufacturing parts. The disposal of dangerous materials in the environment, whether in a marine area like oceans, seas, or bays, or in wildlife is leading to the death of many animals.

Biopolymers are a new class of materials with the potential to be used as substitutes for chemically synthesized polymers. Recently, biopolymers have received considerable interest due to a growing focus on sustainable evolution. Biopolymers may be made from natural sources and can contain a wide range of substances including glycan (celluloses, gellan gum, gelatin, gums, and bromelain), animal-based protein (whey, collagen, and gelatin), and lipids (bee wax, ceara wax, and triacylglycerol). Many biopolymers have a number of useful eco-friendly properties, including being non-reactive, lightness, stable, and safe, as well as demonstrating potentially useful form and size variability. Biopolymers have been successfully applied in the pharmaceutical and medical industries, as well as in the production of containers and wrapping materials, one-use flatware, and sanitary, electric and electronic, automobile, and agricultural greenhouses materials.

Natural biopolymers are also used as disintegrants, binders, film formers, cellulose derivatives, modulating agents for drug release, thickeners, emulsifying agents, and gelling agents. Plant-based biopolymers have an essential part in many fields such as pharmacology, nutritional supplements, cosmetics, and dietary supplements. They also play an important part in modern medicines to provide medical supplies. Moreover, natural fiber can also act as a binder where it has been increasingly popular in recent years. Their advantages are biocompatibility, environmentally safe, availability, affordability, and biodegradability.

Binders are polymeric fillers with bonding and adhering characteristics. Durability, rheology, and strength properties of the material after the binder is added are all affected by the mechanism of binding to the substance. When compared to commercial binders, biological binders such as guar gum, gum arabic, xanthan gum, gum karaya, and natural agarose binders provide exceptional performance and several benefits. Recent work has identified *Abelmoschus esculentus* (Okra) gum as particularly well suited to use as a tablet binder, with the Okra gum providing improved hardness, dissolution rate, and deformability. *Abelmoschus esculentus* gum has also been used as a binder in paracetamol tablet formulations, and the *Abelmoschus esculentus* gum provided improved binder concentration and strength.

Prior efforts to use Okra in the manufacturing of polymer composites have been limited to using Okra as a reinforcing agent in a composite relying upon commercially synthesized resins.

Thus, a bio-composite plastering material and method of making the bio-composite plastering material solving the aforementioned problems is desired.

SUMMARY

A bio-composite plastering material includes a mixture of sand-silica and *Abelmoschus esculentus* powder. The bio-composite plastering material has increased compressive strength depending upon the concentration of *Abelmoschus esculentus* powder used. The method of making the bio-composite plastering material includes milling sand-silica, mixing powdered *Abelmoschus esculentus* powder with the sand-silica to produce a first mixture, enriching the first mixture of multi-walled carbon nanotubes (MWCNT), and mixing water with the first mixture to produce the casting material. The casting material may then be plaster cast by any well-known method in the art, including but not limited to pressing the casting material in a hot press and drying the resulting bio-composite material in an oven.

In an embodiment, the bio-composite plastering material may include between about 5% to about 15% *Abelmoschus esculentus*. For example, the bio-composite plastering material may include about 5%, 6%, 7%, 8%, 9%, 10%, 11%, 12%, 13%, 14%, or 15% *Abelmoschus esculentus*.

In an embodiment, the sand-silica may be milled to different average particle sizes. For example, the sand-silica may be milled to an average particle size between about 25 microns and about 850 microns. In a further embodiment, the sand-silica may be milled to an average particle size of about 25, 50, 75, 100, 150, 200, 250, 300, 350, 400, 450, 500, 550, 600, 650, 700, 750, 800, 850, or 900 microns.

In an embodiment, the bio-composite plastering material may include between about 0.25 weight % and about 1 weight % MWCNT. For example, the bio-composite plastering material may include about 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, or 1% MWCNT by weight.

These and other features of the present subject matter will become readily apparent upon further review of the following specification.

BRIEF DESCRIPTION OF THE DRAWINGS

FIG. 1 depicts a graph illustrating the compressive strength of a number of sand-silica and *Abelmoschus escu-*

*lentus* bio-composites using a range of concentrations of *Abelmoschus esculentus* and average particle sizes of sand-silica.

Similar reference characters denote corresponding features consistently throughout the attached drawings.

DETAILED DESCRIPTION OF THE PREFERRED EMBODIMENTS

A bio-composite plastering material includes a mixture of sand-silica, *Abelmoschus esculentus* powder, and multi-walled carbon nanotubes (MWCNTs). The bio-composite plastering material has increased compressive strength depending upon the concentration of *Abelmoschus esculentus* powder used. The inclusion of MWCNTs provides further enhancements in compressive strength, elastic modulus, toughness, and ductility of the bio-composite.

Figure 4:
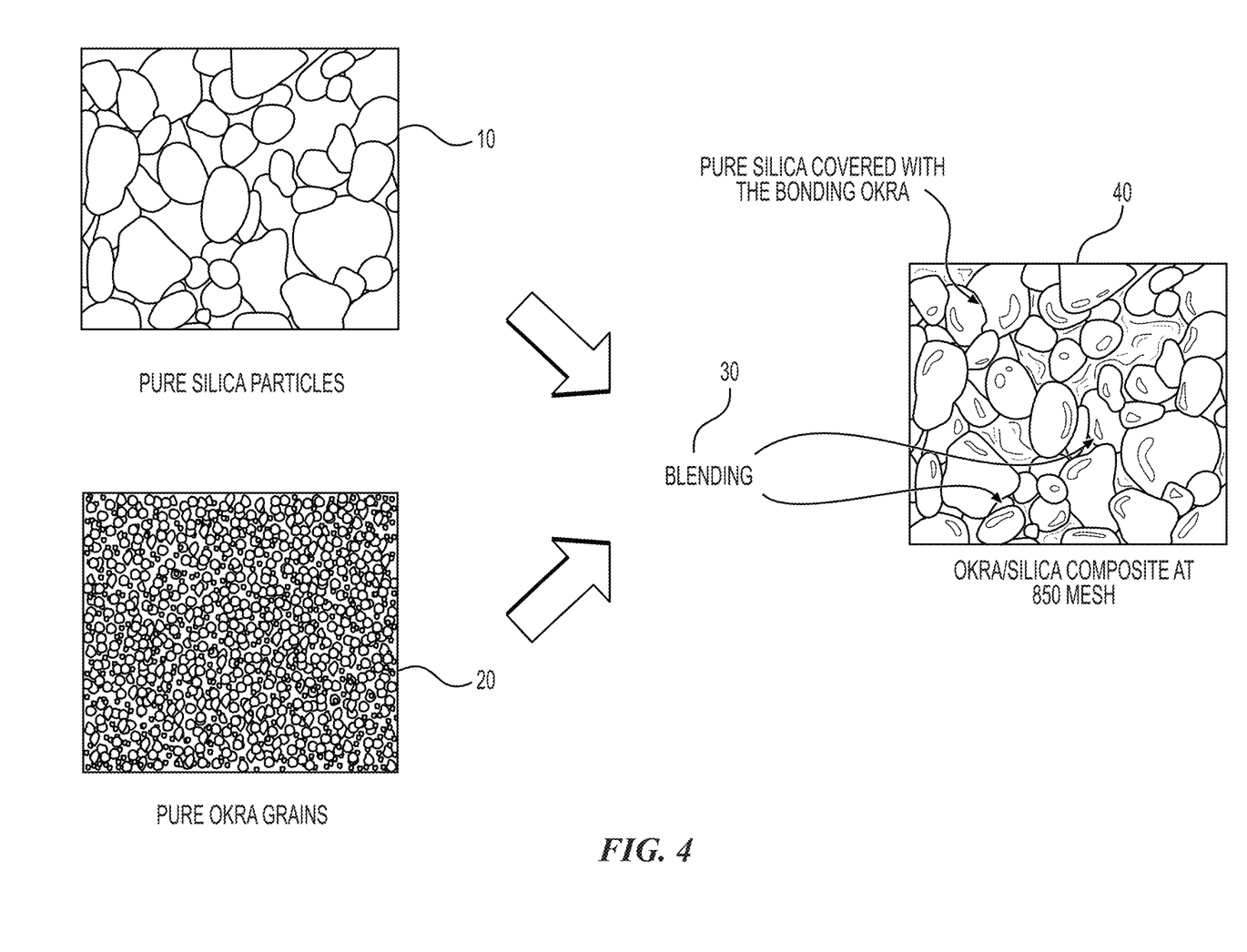
FIG. 4 depicts a flowchart of one embodiment of making the bio-composite plastering material.

As shown in FIG. 4, a method of making the bio-composite plastering material includes sieving sand-silica to produce sand-silica of a uniform particle size 10, providing powdered *Abelmoschus esculentus* grains 20, mixing the powdered *Abelmoschus esculentus* grains and the sand-silica to provide a mixture 30, and adding water to the mixture to produce the bio-composite plastering material 40.

Figure 5:
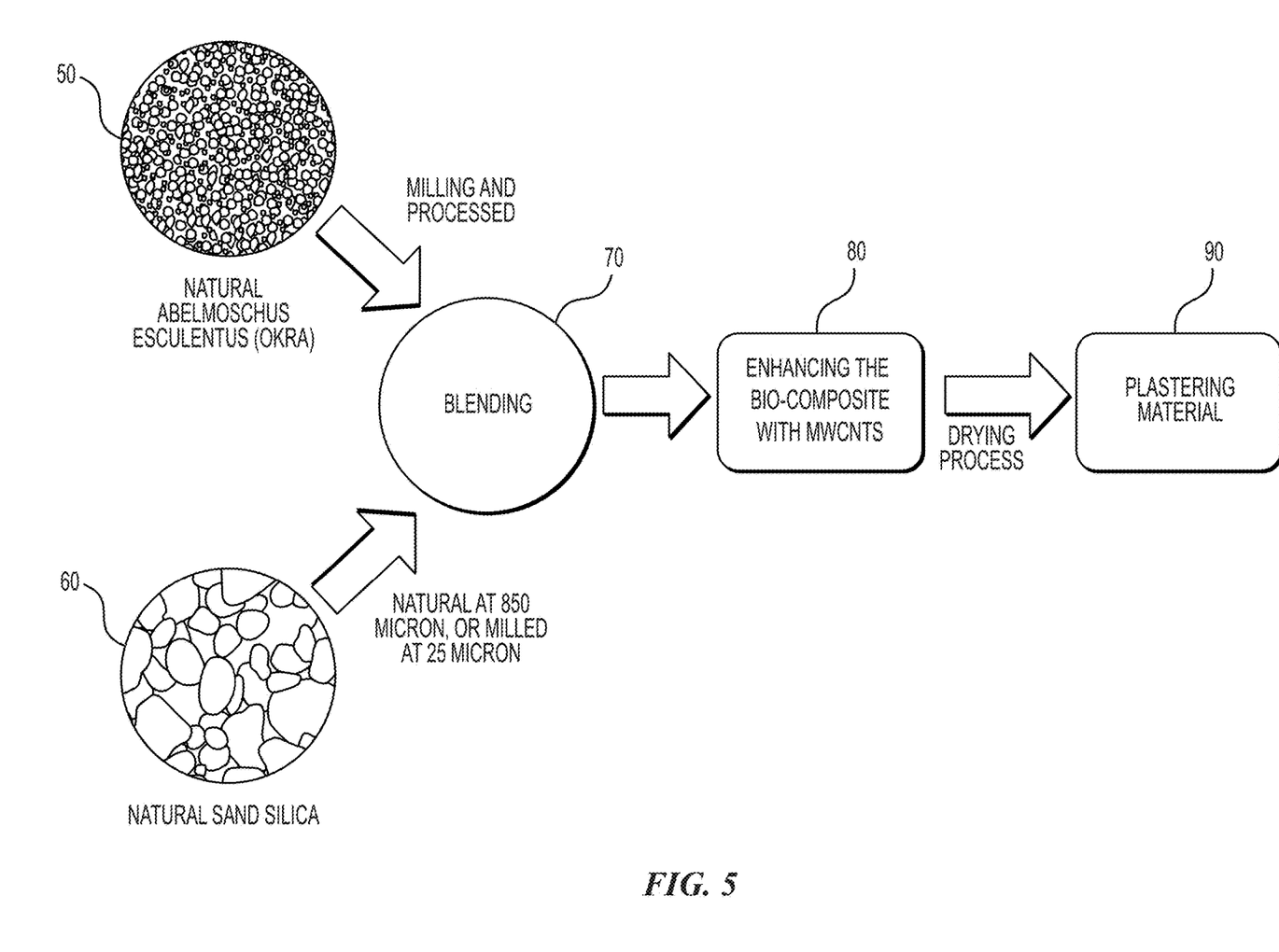
FIG. 5 depicts a flowchart of an alternative embodiment of making the bio-composite plastering material.

Optionally, as shown in FIG. 5, the method may include milling the sand-silica 60 and combining 70 the milled and sieved sand-silica 60 with the *Abelmoschus esculentus* powder 50. The resulting bio-composite may then be enhanced 80 by the addition of MWCNTs. The bio-composite may then be plaster cast 90 by any well-known method in the art, including but not limited to pressing the bio-composite in a hot press and drying the resulting bio-composite material in an oven to form the plastering material.

As used herein, "*Abelmoschus esculentus*" refers to the plant species *Abelmoschus esculentus*, also known as Okra, Ladies' Fingers, or Ochro.

In an embodiment, the bio-composite plastering material may include between about 5% to about 15% *Abelmoschus esculentus*. For example, the bio-composite plastering material may include about 5%, 6%, 7%, 8%, 9%, 10%, 11%, 12%, 13%, 14%, or 15% *Abelmoschus esculentus*.

In an embodiment, the sand-silica may be milled to different average particle sizes. For example, the sand-silica may be milled to an average particle size between about 25 microns and about 850 microns. In a further embodiment, the sand-silica may be milled to an average particle size of about 25, 50, 75, 100, 150, 200, 250, 300, 350, 400, 450, 500, 550, 600, 650, 700, 750, 800, or 850 microns.

In an embodiment, the sand-silica may be either natural sand-silica or commercially available ground sand-silica.

In an embodiment, the bio-composite plastering material may include between about 0.25% and about 1% MWCNT. For example, the bio-composite plastering material may include about 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, or 1% MWCNT.

Notably, the inclusion of the MWCNT provides remarkable enhancements in mechanical properties compared to formulations without MWCNT. Through exhaustive experimentation and optimization, the present subject matter has achieved an unparalleled interaction among its constituents. Furthermore, the MWCNTs integrated into this formulation possess carefully designed properties aimed at maximizing the material mechanical performance of the developed composite.

In an embodiment, the MWCNT may have an outer diameter of about 50 nanometers or more. The MWCNT may further have an inner diameter ranging from about 5 to about 15 nanometers, and lengths spanning between about 10 and about 20 micrometers. These specifications ensure the MWCNT are compatible with the matrix, facilitating efficient reinforcement throughout the material. With a purity exceeding 95% and a specific surface area (SSA) exceeding 60 square meters per gram, these MWCNTs are accurately engineered to offer supreme enhancements in mechanical properties. Their high purity minimizes impurities that could compromise material integrity, while their extensive surface area facilitates robust interfacial interactions within the composite, strengthening its overall strength and durability. The strategic incorporation of these meticulously engineered MWCNTs plays a pivotal role in elevating the material mechanical characteristics, including strength, durability, and ductility, surpassing formulations lacking MWCNTs. Furthermore, the precise particle engineering extends beyond the MWCNTs to encompass the selection of sand silica particles sieved to 250 microns. This considered choice ensures optimal particle size distribution, enhancing the material cohesion and structural integrity, thereby offering superior performance tailored for diverse construction applications.

The incorporation of okra not only provides a sustainable alternative but also contributes to the material cohesive structure, fostering resilience and longevity. Moreover, the strategic addition of MWCNT within the specified range significantly elevates the material strength, durability, and ductility. By precisely selecting the particle size of sand silica, this invention has optimized material properties, with the 250-micron size exhibiting the most desirable characteristics among various sieved particles. This meticulous control over particle size further enhances the material performance and applicability in construction scenarios. This pioneering invention represents a transformative leap forward in construction materials, showcasing the efficacy of combining bio-based resources with nanotechnology and precise particle engineering to redefine industry standards. The resulting bio-composite repair material not only exceeds conventional alternatives in mechanical performance but also underscores the potential of sustainable solutions in shaping the future of construction.

In an embodiment, the method of making the bio-composite plaster may include first sorting the sand-silica to remove any stones and non-sand particles. The sand-silica may be washed and dried prior to the optional milling step.

In an embodiment, the milling may use a commercial milling machine. Milling may be performed for different periods of time, depending upon the desired average size of the sand-silica particles.

In an embodiment, the *Abelmoschus esculentus* used in the production of the bio-composite plaster may be commercially sourced, powdered *Abelmoschus esculentus*. The *Abelmoschus esculentus* powder may be produced from any part of the *Abelmoschus esculentus* plant, including but not limited to plant waste by-products produced during the farming of Okra.

In an embodiment, the bio-composite plastering material may include an insecticide, a rodenticide, and/or a chemical attractant for insects or rats, or a combination thereof. The insecticide, rodenticide, and chemical attractants may be any suitable substance known in the art.

In an embodiment, the bio-composite plastering material may include plant seeds for use in farming or gardening. The plant seeds could be any seeds capable of germinating a desirable plant species. In use, the bio-composite plastering material comprising the plant seeds would be wetted or soaked for a period of time, causing the bio-composite plastering material comprising the plant seeds to degrade until the seeds were exposed. Once exposed, the seeds could germinate and grow. The thickness of the layer of the bio-composite plastering material covering the seeds could be varied to provide control over the period of time required for the seeds to be exposed.

In an embodiment, the method of preparing the bio-composite material may involve a systematic approach to ensure thorough dispersion of the components and the formation of a homogenous mixture. Initially, sand silica is combined with okra in a step-by-step manner using a shear mixer. This step ensures that the sand silica particles are evenly distributed within the okra matrix. The shear mixer facilitates the uniform dispersion of sand silica particles throughout the okra binder. This mixing step typically lasts for approximately 10 minutes to achieve adequate blending and homogeneity.

Once the sand silica and okra mixture reaches a uniform consistency, pure water is gradually added to the mixture. The addition of water is carried out gradually while continuously mixing to prevent the formation of lumps and ensure thorough wetting of the mixture. The gradual addition of water is crucial to achieving the desired consistency and homogeneity in the composite.

Throughout the addition of water, mixing continues until the mixture reaches a homogenous state. Homogenization ensures that the okra binder, sand silica particles, and water are uniformly distributed throughout the mixture, forming a cohesive paste with consistent properties.

Following the homogenization of the sand silica, okra, and water mixture, MWCNTs are introduced gradually into the composite. The weight of MWCNTs added may be determined based on the predetermined weight ratio designed for the particular intended use of the bio-composite. The gradual addition of MWCNTs ensures proper dispersion and avoids agglomeration of nanotubes within the composite.

After the addition of MWCNTs, the composite undergoes a final mixing and homogenization step to ensure the uniform distribution of MWCNTs throughout the mixture. This step is critical for maximizing the reinforcement effect of MWCNTs and optimizing the mechanical properties of the composite.

In this systematic mixing process, the composite material is prepared with thorough dispersion of components, uniform consistency, and homogeneity, resulting in a high-quality material suitable for various construction applications.

The bio-composite plastering material and method of making same may be better understood in view of the following examples, which are illustrative only and are not intended to limit the present teachings.

Example 1

Production of A Composite Plastering Material

Natural sand-silica was collected and sorted to remove stones and non-sand particles. The natural sand-silica was washed with water and dried. The natural sand-silica was separated into two samples. The first sample was sieved to produce 850 micron average diameter powder. The second sample was milled using a commercial milling machine and sieved to produce 25 micron average diameter powder. Each sample was then mixed with sufficient *Abelmoschus esculentus* powder for a final dry weight percentage of 5%, 10%, or 15% *Abelmoschus esculentus* (with the remainder being sand-silica). The resulting mixture was then gradually sprayed with pure water until it became a homogenous mixture with a clay-like structure. The mixture was then further mixed by hand for 5 minutes, placed in a steel cylindrical mold, and subjected to a 500 kg load for 30 minutes at 70° C. using a hot press. The bio-composite material was then dried in an oven for 15 minutes at a temperature of 95° C., removed, and left at room temperature for at least 2 hours.

Example 2

Testing the Composite Plastering Material

Figure 1:
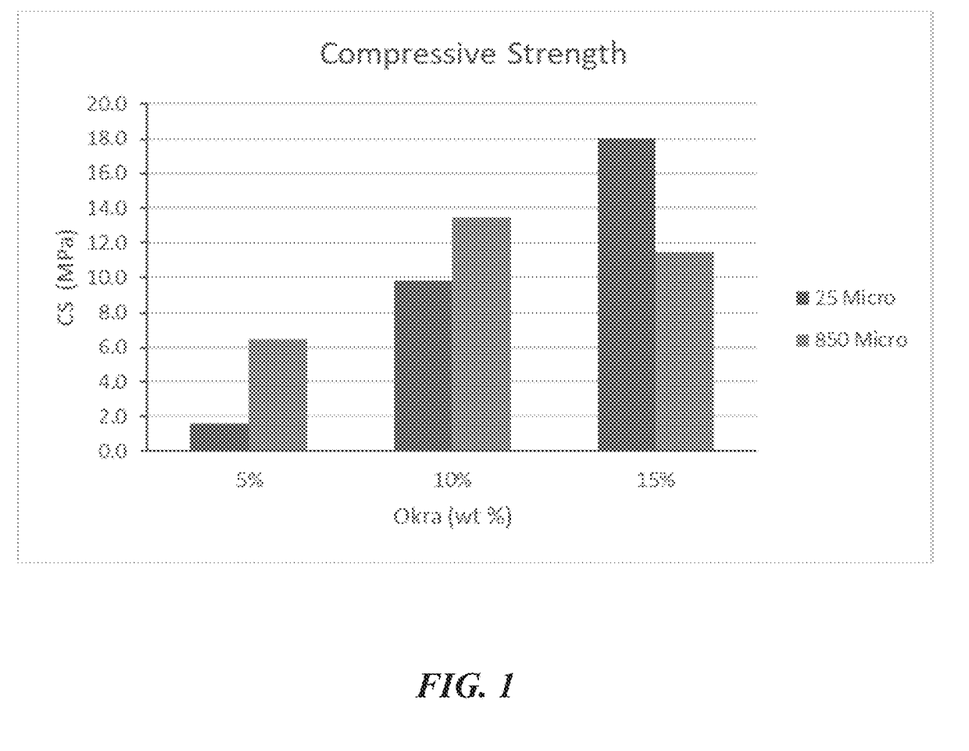

The compressive strength of the various bio-composite materials synthesized according to Example 1 was tested, demonstrating an increase in compressive strength with increased concentration of *Abelmoschus esculentus* powder up to 15% for the samples using 25 micron milled sand-silica and up to 10% for the samples using 850 micron natural sand-silica. (See FIG. 1 and Tables 1-2) Notably, for all samples tested containing 10% or 15% *Abelmoschus esculentus* powder the compressive strength exceeded 7 MPa, and thus fell within the range of common plastering materials used for construction materials.

Figure 2:
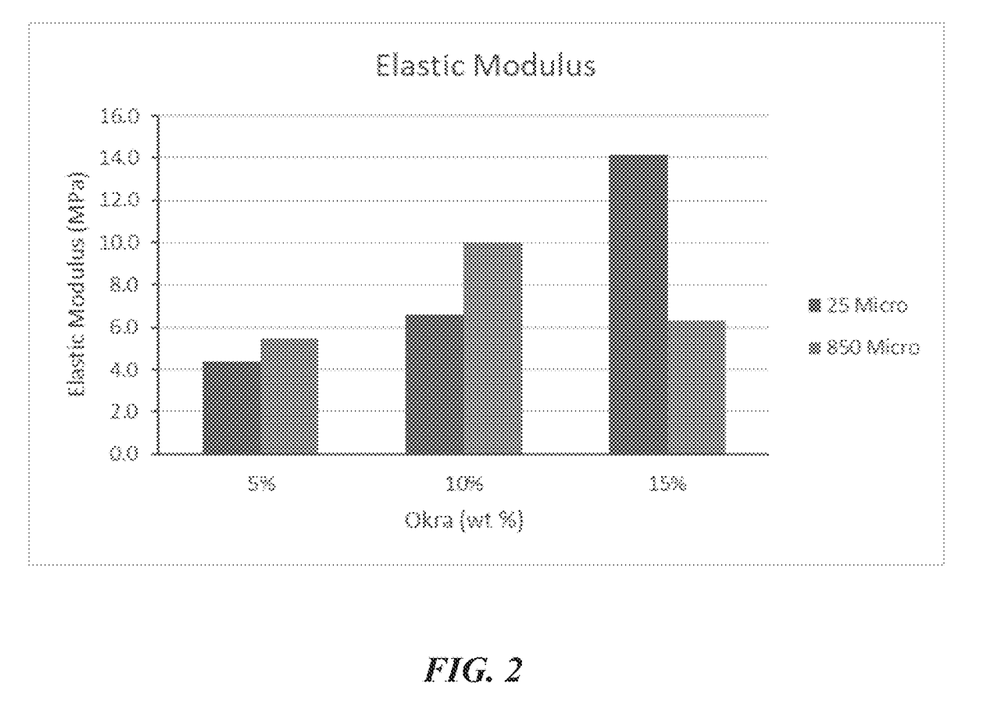
FIG. 2 depicts a graph illustrating the elastic modulus of a number of sand-silica and *Abelmoschus esculentus* bio-composites using a range of concentrations of *Abelmoschus esculentus* and average particle sizes of sand-silica.

The elastic modulus of the various bio-composite materials synthesized according to Example 1 was tested, demonstrating a linear increase in the elastic modulus up to 15% *Abelmoschus esculentus* powder for the samples using 25 micron milled sand-silica and up to 10% for the samples using 850 micron natural sand-silica. (See FIG. 2 and Tables 1-2)

Figure 3:
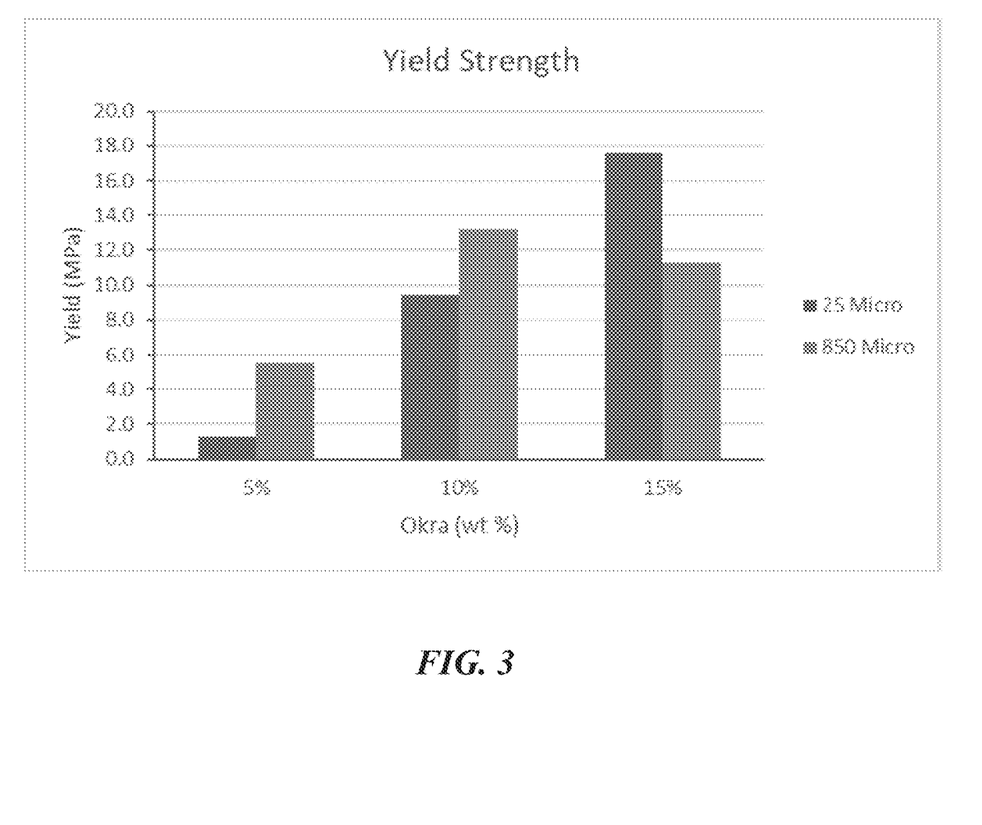
FIG. 3 depicts a graph illustrating the yield strength of a number of sand-silica and *Abelmoschus esculentus* bio-composites using a range of concentrations of *Abelmoschus esculentus* and average particle sizes of sand-silica.

The yield strength of the various bio-composite materials synthesized according to Example 1 was tested, demonstrating an increase in yield strength characteristics with increased concentration of *Abelmoschus esculentus* powder up to 15% for the samples using 25 micron milled sand-silica and up to 10% for the samples using 850 micron natural sand-silica. (See FIG. 3 and Tables 1-2)

TABLE 1

Mechanical Properties of Composite Material With 25 Micron Sand-Silica

| Abelmoschus esculentus % | Compressive Strength (MPa) | Yield Strength (MPa) | Elastic Modulus (MPa) | Ductility (%) |
|---|---|---|---|---|
| 5 | 1.6 | 1.3 | 4.4 | 18.5 |
| 10 | 9.8 | 9.4 | 6.6 | 17.5 |
| 15 | 18.0 | 17.6 | 14.1 | 12.2 |

TABLE 2

Mechanical Properties of Composite Material With 850 Micron Sand-Silica

| Abelmoschus esculentus % | Compressive Strength (MPa) | Yield Strength (MPa) | Elastic Modulus (MPa) | Ductility (%) |
|---|---|---|---|---|
| 5 | 6.4 | 5.5 | 5.5 | 18.7 |
| 10 | 13.4 | 13.2 | 10.0 | 33.5 |
| 15 | 11.5 | 11.3 | 6.3 | 63.5 |

Example 3

Testing A Bio-Composite Plastering Material

The compression strength of the hybrid bio-composite experiences a significant growth upon the introduction of a mere 0.25 weight percent (w %) of multi-walled carbon nanotubes (MWCNTs) with respect to non MWCNT composite. This enhancement is attributed to the unique structural characteristics of MWCNTs, which include stacked structures featuring exposed edge planes. (See FIG. 6).

Figure 6:
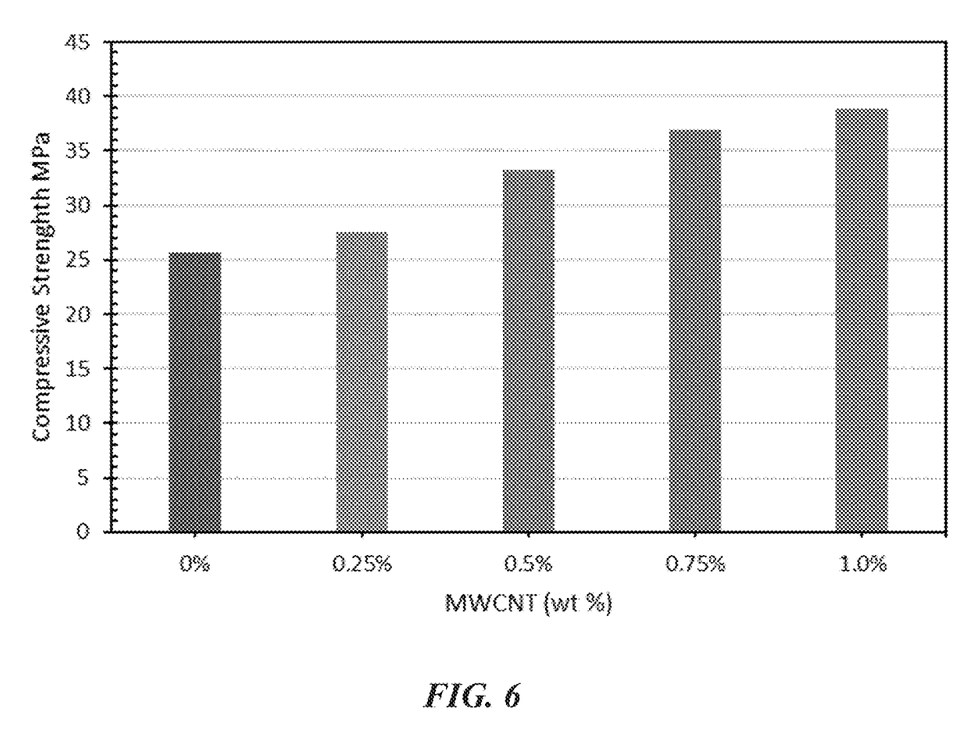
FIG. 6 depicts a graph illustrating the compressive strength of the bio-composite mixture when 0.25 weight % to 1 weight % MWCNTs are added to the bio-composite.

Upon incorporation into the hybrid bio-composite, these MWCNTs contribute to an expanded surface area, thereby fostering improved bond characteristics within the material. Consequently, the compression strength of the composite undergoes a notable increase. Furthermore, the heightened mechanical properties observed can be attributed to the formation of a denser microstructure within the composite matrix, facilitated by the presence of MWCNTs. Additionally, the introduction of MWCNTs prompts a heightened degree of hydration within the composite, further bolstering its mechanical resilience. As the concentration of MWCNTs escalates from 0.25 w % to 0.5 w %, 0.75 w %, and 1.0 w %, a corresponding escalation in compression strength is observed. Specifically, the compression strengths exhibit increments of 7.4%, 29.6%, 44%, and 51.3%, respectively, relative to the non-reinforced composite (i.e., devoid of MWCNTs). This progressive enhancement underscores the profound impact of MWCNT incorporation on the mechanical robustness of the hybrid bio-composite, affirming its potential for diverse applications in construction and beyond.

A high elastic modulus plays a pivotal role in minimizing lateral deformations within the hybrid bio-composite, thereby offering the potential to reduce the size of structural elements. Achieving this desirable characteristic necessitates the incorporation of MWCNTs as reinforcement materials in the hybrid bio-composite structure. Remarkably, even low concentrations of MWCNTs can yield significant improvements in the elastic modulus.

Figure 7:
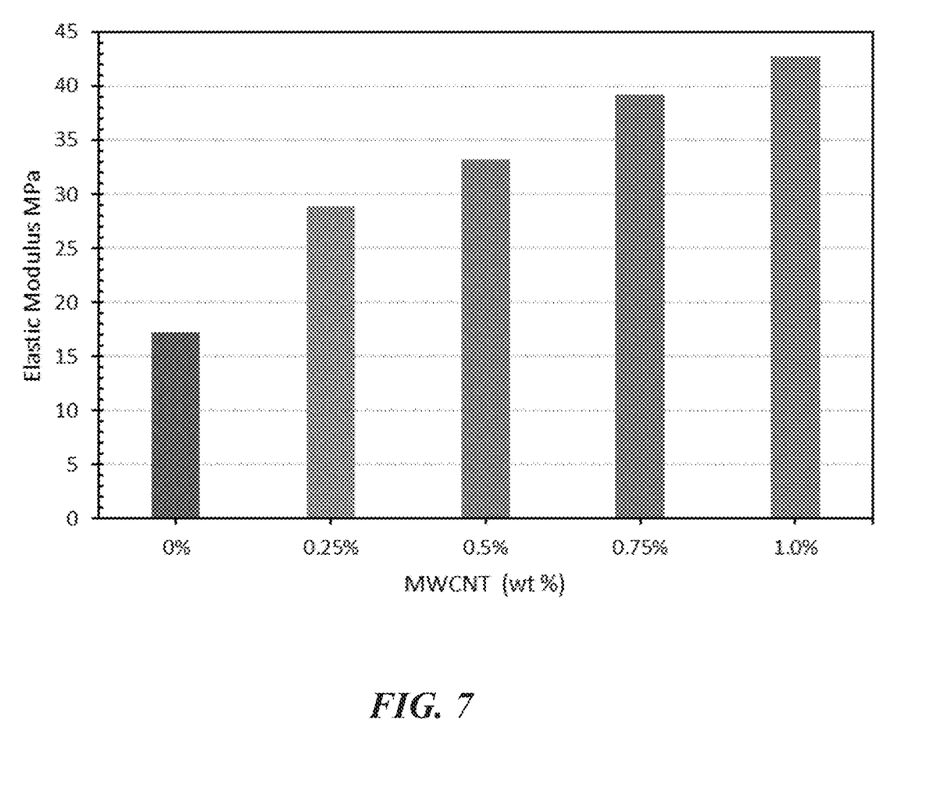
FIG. 7 depicts a graph illustrating the elastic modulus of the bio-composite mixture when 0.25 weight % to 1 weight % MWCNTs are added to the bio-composite.

As illustrated in FIG. 7, the addition of a mere 0.25 weight percent (w %) of MWCNTs results in a notable 5% increase in the elastic modulus. Subsequent increments in MWCNT concentration, by 0.5 w % and 0.75 w %, elicit gradual enhancements in the elastic modulus. Remarkably, the elastic modulus experiences an exceptional surge, exceeding 55%, with a MWCNT content of 1.0% w %. This remarkable progression underscores the profound impact of MWCNT incorporation on the hybrid bio-composite's mechanical properties. The observed increase in elastic modulus can be attributed to the potent action of MWCNTs, which serve to augment the stiffness within the hybrid bio-composite. Additionally, the presence of MWCNTs facilitates modifications at the matrix interface, thereby enhancing the efficiency of load transfer within the hybrid bio-composite. These combined effects culminate in a robust and resilient material capable of withstanding significant mechanical stresses, thereby offering promising prospects for applications in various structural contexts.

Toughness, denoting a material's capacity to undergo plastic deformation without fractures, is a critical attribute influencing its performance. The incorporation of multi-walled carbon nanotubes (MWCNTs) into our hybrid bio-composites yields a substantial improvement in material toughness. Specifically, the addition of MWCNTs enhances the toughness of the composite material. Remarkably, the introduction of a mere 0.25% MWCNTs by weight (w %) initiates a gradual yet discernible augmentation in toughness. Notably, this improvement shows a notable enhancement upon introducing 0.5% w % of MWCNTs. (See FIG. 8)

Figure 8:
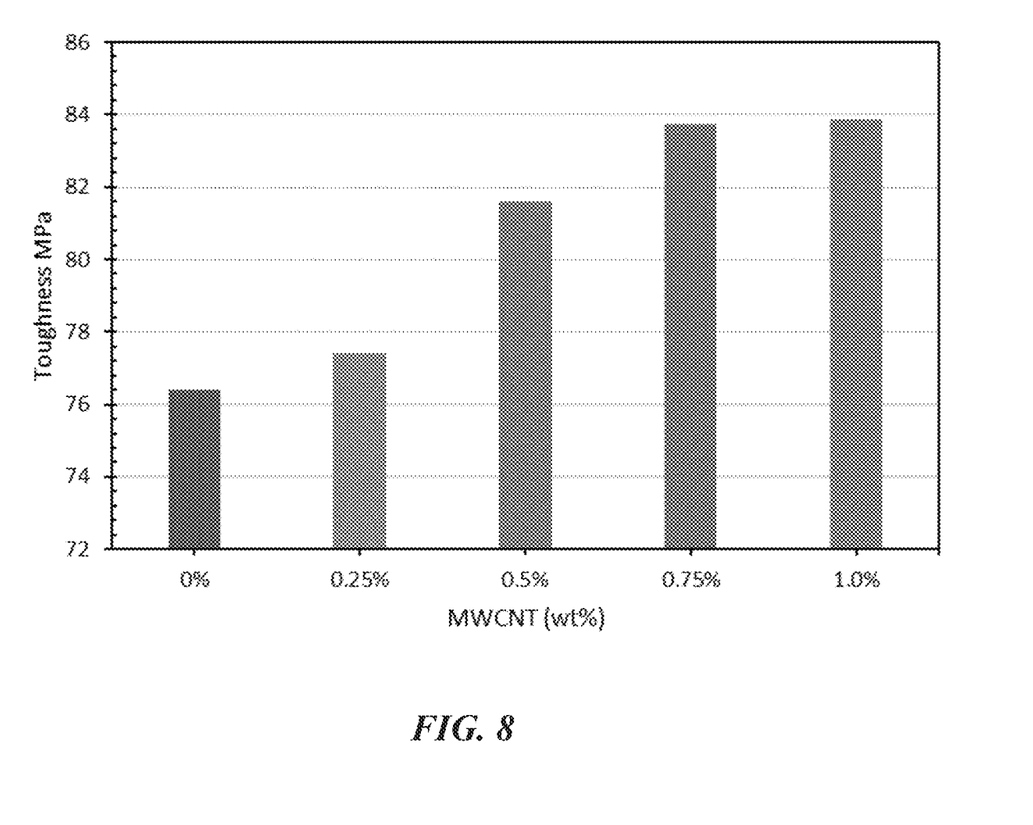
FIG. 8 depicts a graph illustrating the toughness of the bio-composite mixture when 0.25 weight % to 1 weight % MWCNTs are added to the bio-composite.

Subsequent increments in MWCNT content result in further gradual enhancements, with the 0.5% w % figure emerging as the optimal concentration for maximizing toughness. Crucially, our hybrid bio-composite exhibits superior bonding quality, ensuring effective dispersion of MWCNTs throughout the material matrix. Taking advantage of the extensive spacings inherent to MWCNTs, the reinforcement mechanism operates to regulate the initiation and propagation of microcracks, thereby bolstering toughness. Notably, the efficacy of MWCNTs varies with their concentration in w %, with optimal performance observed at 0.5% w %. The experimental results affirm this trend, with increases of 11.7%, 17.7%, 20.8%, and 21.0% observed for MWCNT concentrations of 0.25%, 0.5%, 0.75%, and 1% w %, respectively. This substantial improvement underscores the pivotal role of MWCNTs in enhancing the toughness of our hybrid bio-composite, thereby accentuating its suitability for a myriad of demanding applications across diverse industries.

Toughness, a typical measure of a material's ability to endure plastic deformation without yielding to fractures, stands as a paramount factor shaping its performance landscape. In this context, integrating multi-walled carbon nanotubes (MWCNTs) within our hybrid bio-composites represents a transformative leap, markedly elevating the material's toughness profile. This enhancement is particularly pronounced in the toughness domain, where adding MWCNTs imparts slight resilience to the composite material. (see FIG. 9)

Figure 9:
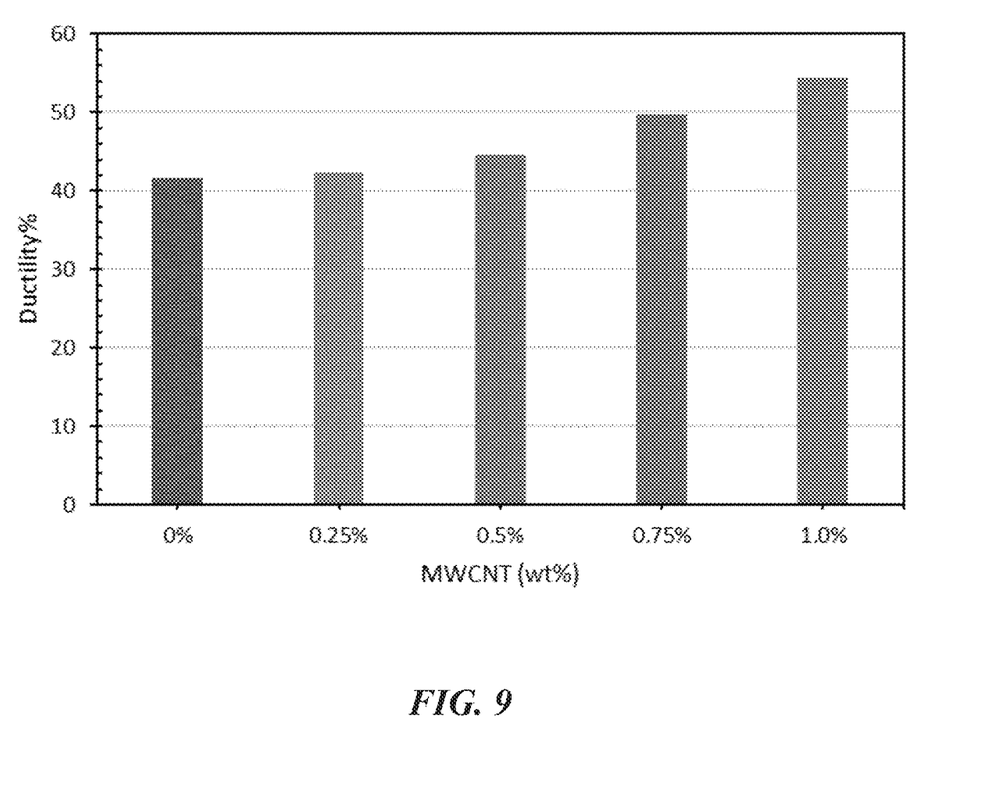
FIG. 9 depicts a graph illustrating the ductility of the bio-composite mixture when 0.25 weight % to 1 weight % MWCNTs are added to the bio-composite.

Remarkably, incorporation of 0.25% MWCNTs by weight (w %) showed a slight gradual toughness increase. Noteworthy is the distinct jump in performance witnessed upon reaching a concentration of 0.5% w % of MWCNTs. Subsequent increments in MWCNT content continue to yield incremental improvements, with the 0.5% w % mark emerging as the pinnacle concentration for maximizing toughness. The most significance is the exceptional bonding quality exhibited by our hybrid bio-composite, facilitating the seamless dispersion of MWCNTs throughout the material matrix. Leveraging the expansive spacings inherent to MWCNTs, the reinforcement mechanism orchestrates a meticulous regulation of microcrack initiation and propagation, thereby restorative toughness. It is worth highlighting that the efficacy of MWCNTs is intricately tied to their concentration in w %, with optimal performance distinctly observed at 0.5% w %. This empirical trajectory is unequivocally validated by experimental results, where the augmentation in toughness manifests as increases of 11.7%, 17.7%, 20.8%, and 21.0% for MWCNT concentrations of 0.25%, 0.5%, 0.75%, and 1% w %, respectively. Such substantial enhancements underscore the pivotal role played by MWCNTs in fortifying the toughness of our hybrid bio-composite, thus accentuating its versatility and applicability across a myriad of demanding industrial contexts.

It is to be understood that the bio-composite plastering material and method of making the same is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A bio-composite plastering material comprising
   between about 5% and about 15% final dry weight percentage powdered *Abelmoschus esculentus;*
   sand-silica; and
   between about 0.25% by weight and 1% by weight multi-walled carbon nanotubes;
   wherein the final dry weight percentage is the percentage of the final dry weight of the bio-composite plastering material.

2. The bio-composite plastering material as recited in claim 1, wherein the bio-composite plastering material comprises about 5% final dry weight percentage powdered *Abelmoschus esculentus.*

3. The bio-composite plastering material as recited in claim 1, wherein the bio-composite plastering material comprises about 10% final dry weight percentage powdered *Abelmoschus esculentus.*

4. The bio-composite plastering material as recited in claim 1, wherein the bio-composite plastering material comprises about 15% final dry weight percentage powdered *Abelmoschus esculentus.*

5. The bio-composite plastering material as recited in claim 1, wherein the sand-silica has an average diameter of between about 25 microns and about 850 microns.

6. The bio-composite plastering material as recited in claim 5, wherein the sand-silica has an average diameter of about 250 microns.

7. The bio-composite plastering material as recited in claim 1, wherein the bio-composite plastering material comprises about 0.25% by weight multi-walled carbon nanotubes.

8. The bio-composite plastering material as recited in claim 1, wherein the bio-composite plastering material comprises about 0.5% by weight multi-walled carbon nanotubes.

9. The bio-composite plastering material as recited in claim 1, wherein the bio-composite plastering material comprises about 0.75% by weight multi-walled carbon nanotubes.

10. The bio-composite plastering material as recited in claim 1, wherein the bio-composite plastering material comprises about 1% by weight multi-walled carbon nanotubes.

11. A method of making the bio-composite plastering material of claim 1 comprising the steps of:
    sieving sand-silica to produce sand-silica with particles of a uniform size;
    mixing the sieved sand-silica with *Abelmoschus esculentus* powder to produce a first mixture;
    mixing water with the first mixture to produce the bio-composite plastering material; and
    enhancing the bio-composite plastering material by adding multi-walled carbon nanotubes to the bio-composite plastering material.

12. The method of claim 11, comprising milling the sand-silica prior to the sieving step.

13. The method of claim 11, comprising sieving the milled sand-silica to produce a sand-silica having an average diameter of 250 microns.

14. The method of claim 11, comprising plaster casting the bio-composite plastering material.

15. The method of claim 14, wherein the plaster casting comprises pressing the bio-composite plastering material in a hot press and drying the bio-composite plastering material in an oven.

16. The method of claim 11, comprising mixing the sieved sand-silica with about 5% *Abelmoschus esculentus* powder.

17. The method of claim 11, comprising mixing the sieved sand-silica with about 10% *Abelmoschus esculentus* powder.

18. The method of claim 11, comprising mixing the sieved sand-silica with about 15% *Abelmoschus esculentus* powder.

19. The method of claim 11, wherein enhancing the bio-composite plastering material comprising adding between about 0.25% by weight and 1% by weight multi-walled carbon nanotubes to the bio-composite plastering material.

20. The method of claim 11, wherein the mixing water with the first mixture further comprises gradually spraying water on the first mixture until it becomes a homogenous mixture.

* * * * *